United States Patent
Herrmann

(10) Patent No.: US 6,961,558 B1
(45) Date of Patent: Nov. 1, 2005

(54) METHOD AND RECEIVER FOR RECEIVING A RADIO BROADCAST SIGNAL HAVING ENCODED CONTENTS

(75) Inventor: Matthias Herrmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,376

(22) PCT Filed: Dec. 21, 1999

(86) PCT No.: PCT/DE99/04045

§ 371 (c)(1),
(2), (4) Date: Nov. 26, 2001

(87) PCT Pub. No.: WO00/48350

PCT Pub. Date: Aug. 17, 2000

(30) Foreign Application Priority Data

Feb. 11, 1999 (DE) ................................ 199 05 628

(51) Int. Cl.[7] ............................................. H04M 1/66
(52) U.S. Cl. ..................... 455/410; 455/411; 455/3.02; 455/3.03; 455/168.1; 455/68; 455/556.1; 455/3.06; 380/239; 380/278; 380/37
(58) Field of Search ...................... 455/410, 411, 3.02, 455/3.06, 3.03, 168.1; 380/239, 278, 37, 380/68, 556.1, 556.2

(56) References Cited

U.S. PATENT DOCUMENTS

| | | | | |
|---|---|---|---|---|
| 4,567,512 A | * | 1/1986 | Abraham | 725/93 |
| 4,807,052 A | * | 2/1989 | Amano | 348/734 |
| 4,989,245 A | * | 1/1991 | Bennett | 380/241 |
| 4,991,207 A | | 2/1991 | Shiraishi et al. | |
| 5,524,051 A | * | 6/1996 | Ryan | 380/237 |
| 5,642,397 A | * | 6/1997 | Agbaje-Anozie | 370/313 |
| 5,920,625 A | * | 7/1999 | Davies | 380/210 |
| 6,411,712 B1 | * | 6/2002 | Yoshida et al. | 380/37 |
| 6,466,671 B1 | * | 10/2002 | Maillard et al. | 380/227 |
| 2002/0021809 A1 | * | 2/2002 | Salo et al. | 380/239 |
| 2003/0002680 A1 | * | 1/2003 | Akiyama et al. | 380/278 |

FOREIGN PATENT DOCUMENTS

| | | |
|---|---|---|
| EP | 0 804 012 | 10/1997 |
| GB | 2 286 751 | 8/1995 |
| GB | 2 309 566 | 7/1997 |

* cited by examiner

*Primary Examiner*—Sonny Trinh
*Assistant Examiner*—Huy Phan
(74) *Attorney, Agent, or Firm*—Kenyon & Kenyon

(57) ABSTRACT

A receiver for a radio broadcast signal, in particular a car radio, and a method for receiving a radio broadcast signal, including a signal decoder for decoding an audio signal contained in the radio broadcast signal in encoded form, and/or for decoding a data signal contained in the radio broadcast signal in encoded form, the signal decoder being operable so that the encoded signal is only decoded, when the signal decoder obtains an external authentication signal, which is received via an external transmission path that is different from the transmission path of the radio broadcast signal.

4 Claims, 1 Drawing Sheet

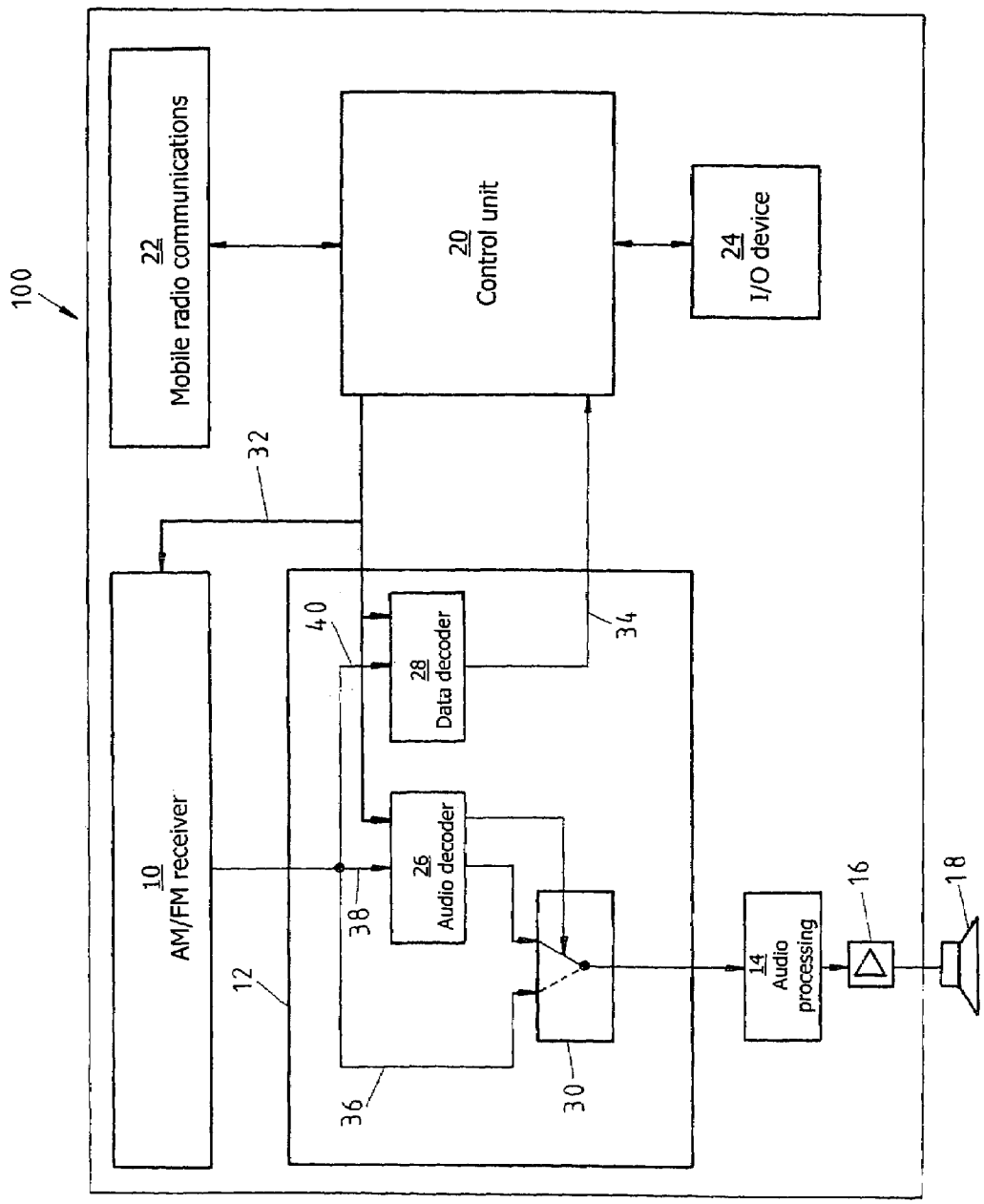

METHOD AND RECEIVER FOR RECEIVING A RADIO BROADCAST SIGNAL HAVING ENCODED CONTENTS

FIELD OF THE INVENTION

The present invention relates to a receiver for a radio broadcast signal, in particular a car radio or radiophone and also relates to a method for receiving a radio broadcast signal.

BACKGROUND INFORMATION

Program transmissions may be received in an unrestricted manner, and their use may be compensated for by the payment of appropriate taxes, e.g., to the GEMA (Gesellschaft fuer musikalische Auffuehrungs—und mechanische Vervielfaeltigungsrechte (Society for Musical Performing Rights and Mechanical Reproduction Rights)) in Germany. However, offers and program content may be desired, which go beyond such broadcast transmissions, and which may only be realized by the user at an additional cost. Such offers may be distributed in encoded form by suppliers, using conventional program transmission channels, anyone being able to receive the signal, but the information contained in it only being rendered accessible to the user, when a person has paid an appropriate usage fee.

To this end, a paying customer receives a decoding device, which is to be looped into the signal path, between the antenna and the receiver, and which decodes the information transmitted in encoded form. But in this case, it is believed to be disadvantageous that a separate, supplier-specific decoding device may be necessary for each supplier. Therefore, when a customer would like to accept such encoded offers, a person must first obtain a decoding device, and then may need to connect it. However, this is thought to be impractical, and it may discourage other potential customers from accepting encoded offers. Furthermore, the additional, required hardware expansion may be cost-intensive on the side of the user.

SUMMARY OF THE INVENTION

An object of an exemplary embodiment and/or exemplary method of the present invention is to be able to easily make additional, paid offers available in the area of program transmission.

For this purpose, a signal decoder, which decodes an audio signal received in encoded form in the radio broadcast signal and/or decodes a data signal received in encoded form in the radio broadcast signal, and the signal decoder is operable so that the encoded signal is only decoded, when the signal decoder obtains an external authenticating signal received via an external transmission path that is different from a transmission path of the radio broadcast signal.

It is believed that this has the advantage that the signal decoder can be remotely controlled, without the necessity of additional authentication hardware to be individually provided for each customer. This should allow information transmitted via a radio receiver to be released in a selective and controlled manner, e.g., in exchange for fees, using a standardized receiver. Only the data supplier has to worry about the remote-controlled enabling of the signal decoder. The user does not have to make any changes to his or her device for purposes of authentication. In addition, supplier-specific hardware should not be necessary, so that offers of various suppliers can be accepted, using a single device.

To distribute individual authorizations, the external transmission path advantageously includes a mobile radio-communications device (mobile transceiver), which especially complies with the GSM standard, and is connected to the receiver via a communication link, in particular via a wire, infrared, or air interface, the mobile radio device receiving the authentication signal and transmitting it to the receiver, via the communication link.

A unified device, such as a radiophone, is made available by positioning (mounting) the mobile radio-communications device and the receiver in a common housing.

An exemplary embodiment provides a control unit, especially in the form of a processor, which controls the signal decoder and additional, predetermined components of the receiver, via a control bus. A communication link, in particular a wire, infrared, or air interface, is provided between the control unit and the external transmission path, and the control unit transmits the authentication signal to the signal decoder, when the control unit receives the authentication signal from the external transmission path.

An input device that is connected to the control unit may be advantageously provided for the user to input data and commands.

A receiving part, which demodulates a baseband signal from a radio broadcast signal, and a post-connected audio-signal processing unit may be provided in an exemplary embodiment, the signal decoder being situated in a signal path, between the receiving part and the audio-signal processing unit.

To select between decoding or not decoding an audio signal transmitted with the radio broadcast signal, the signal decoder has a multiplexer, a first, looped-through signal path on which no decoding takes place, and a second signal path having an audio decoder, the first and second signal paths being connected to the multiplexer that is controlled by the audio decoder. In this connection, an output of the multiplexer is connected to the audio-signal processing unit.

To select between decoding or not decoding a data signal transmitted with the radio broadcast signal, the signal decoder has a third signal path that includes a data decoder. In this connection, an output of the data decoder is connected to the control unit.

The exemplary method according to the present invention provides for an audio signal contained in the radio broadcast signal in encoded form and/or a data signal contained in the radio broadcast signal in encoded form being decoded, when an external authentication signal is received via an external transmission path that is different from the transmission path of the radio broadcast signal.

It is believed that this has the advantage that paid offers can be made available per remote control, without the necessity of additional authentication hardware to be individually provided to each customer. Therefore, information may be transmitted via a radio receiver to be released in a selective and controlled manner, e.g., in exchange for fees, using a standardized receiver. Only the supplier of the encoded data signal or audio signal must worry about the remote-controlled enabling of a signal decoder. The user does not have to make any changes to his or her device for purposes of authentication. In addition, supplier-specific hardware should not be necessary, so that offers of various suppliers can be accepted, using a single device.

To distribute individual authentications, the authentication signal is transmitted via a mobile telephony network (mobile radio network), to a mobile radio-communications device connected to the receiver by a communications interface, especially by a wire, infrared, or air interface.

A receiver for the transmission path of the radio broadcast signal may be advantageously controlled via the external transmission path.

BRIEF DESCRIPTION OF THE DRAWING

The FIGURE shows an exemplary embodiment of a receiver according to the present invention.

DETAILED DESCRIPTION

The receiver 100 of the FIGURE includes an AM/FM receiving part 10, a signal decoder 12, an audio-signal processing unit 14, an audio power amplifier 16, loudspeaker 18, a control unit 20, a mobile radio-communications part 22 (GSM=Global System for Mobile Communication), and an output and input (input/output) device 24. Signal decoder 12 includes an audio decoder 26, a data decoder 28, and a multiplexer 30. Control unit 20 controls AM/FM receiving part 10, audio decoder 26, and data decoder 28, using a control bus 32. Data decoder 28 has a digital output (data output) 34, which is connected to control unit 20, and via which the control data and user data are transmitted to control unit 20.

A demodulated baseband signal coming from AM/FM receiving part 10 is directed to signal decoder 12, which has three signal branches 36, 38, and 40. First signal branch 36 allows the audio signal to pass through without being affected, second signal branch 38 decodes the audio signal previously encoded on the side of the transmitter, and third signal branch 40 decodes a data stream, which is processed further in control unit 20, e.g., in a processor. By way of multiplexer 30, the two audio signals of the specific signal branches 36, 38 arrive in the block, audio-signal processing 14, which carries out or performs conventional functions, such as sound control, volume control, balance control, or fade control. Which of the signal branches 36 or 38 is presently active at signal decoder 12, depends on the control data transmitted via control bus 32.

Mobile radio-communications part 22 communicates with input device 24 via control unit 20, the input device also being referred to as an MMI (man-machine interface). The control unit evaluates, in part, the data stream coming from mobile radio-communications part 22, and selects appropriate data for controlling signal decoder 12 and, if present, AM/FM receiving part 10. So if mobile radio-communications part 22 receives an appropriate authentication signal, then control unit 20 transmits a corresponding authentication signal via signal bus 32, in order to activate audio decoder 26 and/or data decoder 28.

Therefore, the exemplary embodiment and/or exemplary method of the present invention provides for signal decoder 12 being inserted in the branch of the demodulated baseband of a first transmission path, in this case AM/FM receiver 10, certain signals or data in the baseband signal of the AM/FM receiver being blocked or decoded per remote control, via a second transmission path, in this case a mobile telephony network. As a further option, AM/FM receiver 10 can also be remotely controlled via the second transmission path (mobile telephony network), in order to, for example, select a channel. Corresponding encoding is provided on the transmission side, in the transmission path of AM/FM receiver 10. Furthermore, there is communication between the broadcasting network and the mobile telephony network.

In another exemplary embodiment and/or exemplary method of the present invention, there is provided a combination of a car radio and a mobile radio-communications device in a 1-DIN housing, which is expanded to include the above-mentioned present invention. However, there may also be an arbitrary combination of AM/FM receiving part 10 and mobile radio-communications device 22, which must not necessarily be integrated in a housing. For example, a so-called cellular phone may communicate with a car-radio device via a wire, infrared, or air interface.

What is claimed is:

1. A receiver for receiving a radio broadcasting signal, the receiver comprising:
   a signal decoder for decoding an encoded signal contained in encoded form in the radio broadcast signal, the encoded signal including at least one of an audio signal in encoded form and a data signal in encoded form;
   wherein:
   the encoded signal is decoded only when the signal decoder obtains an external authentication signal that is received via an external transmission path that is different from a transmission path of the radio broadcast signal;
   at least one component of the receiver is controllable using a control signal transmittable via the external transmission path; and
   the signal decoder includes a multiplexer, a first looped-through signal path on which no decoding takes place, and a second signal path including an audio decoder, the first and second signal paths being connected to the multiplexer controlled by the audio decoder.

2. The receiver of claim 1, wherein an output of the multiplexer is connected to a post-connected audio-signal processing unit.

3. The receiver of claim 1, wherein the signal decoder includes a third signal path having a data decoder.

4. The receiver of claim 3, wherein an output of the data decoder is connected to the control unit.

* * * * *